United States Patent [19]

Stirling

[11] Patent Number: 5,131,703
[45] Date of Patent: Jul. 21, 1992

[54] PROTECTIVE COLLISION GUARD FOR VEHICLE

[76] Inventor: Leroy D. Stirling, 38 Cecil St. Box 627, Ridgetown, Ontario, Canada, NoP 2CO

[21] Appl. No.: 766,120

[22] Filed: Sep. 27, 1991

[51] Int. Cl.$^5$ ............................................. B60R 19/42
[52] U.S. Cl. ..................................... 293/127; 293/48; 293/107; 293/109; 280/163
[58] Field of Search ................. 293/127, 48, 107, 109; 280/163

[56] References Cited

U.S. PATENT DOCUMENTS

| | | | |
|---|---|---|---|
| 602,226 | 4/1898 | McKaig | 293/107 X |
| 1,261,552 | 4/1918 | Kingsberry | 293/48 |
| 1,457,259 | 5/1923 | Malluk et al. | 293/107 |
| 1,485,332 | 2/1924 | Edwards | 293/107 |
| 1,645,056 | 10/1927 | Jerrae | 293/107 |
| 1,741,513 | 12/1929 | Finizio | 293/107 |
| 2,202,460 | 5/1940 | Maciel | 293/128 |
| 2,420,894 | 5/1947 | Mee | 293/127 |
| 2,785,921 | 3/1957 | Barenyi | 293/127 X |
| 2,829,915 | 4/1958 | Claveau | 293/109 |
| 3,168,344 | 2/1965 | Barenyi | 293/127 X |
| 3,999,793 | 12/1976 | Roubinet | 293/127 X |
| 4,360,549 | 11/1982 | Ozawa et al. | 428/31 |
| 4,838,592 | 6/1989 | Sobodos et al. | 293/127 X |
| 4,869,538 | 9/1989 | Presley | 293/107 |
| 4,995,659 | 2/1991 | Park | 293/107 |

FOREIGN PATENT DOCUMENTS

| | | | |
|---|---|---|---|
| 895109 | 9/1953 | Fed. Rep. of Germany | 293/127 |
| 2207560 | 8/1973 | Fed. Rep. of Germany | 293/107 |
| 3227633 | 3/1983 | Fed. Rep. of Germany | 280/163 |
| 719607 | 12/1954 | United Kingdom | 293/127 |

*Primary Examiner*—Dennis H. Pedder

[57] ABSTRACT

A protective collision guard for a vehicle includes a continuous hollow member which is attached to the outside of the vehicle and which extends continuously around the outer perimeter thereof. The guard is constructed of an elastomeric material which encloses one or more elongated air chambers therein. The upper edge of the guard extends above the seating surface of the passenger seats inside the vehicle and remains below the lower edge of the access doors to the vehicle.

3 Claims, 1 Drawing Sheet

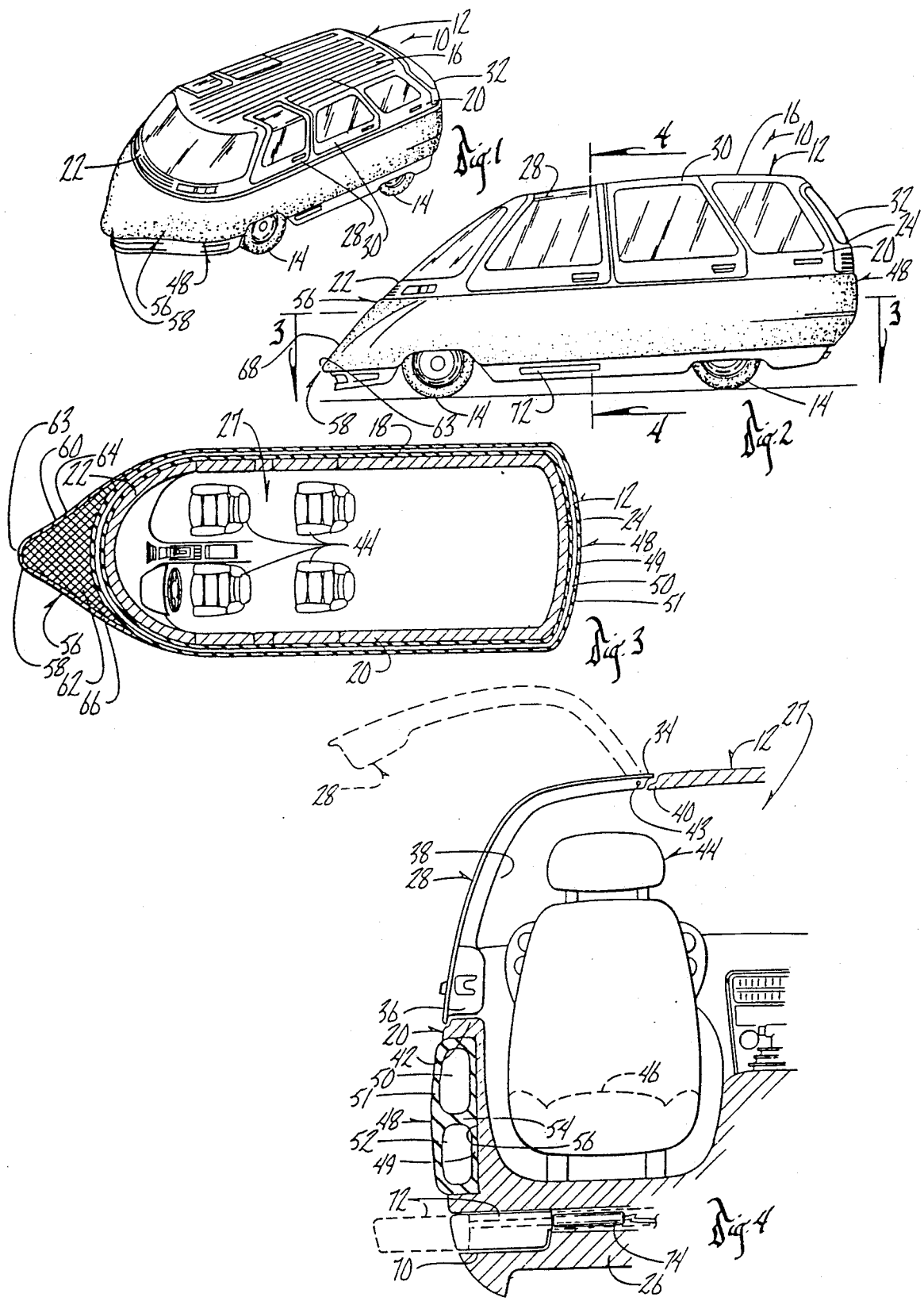

PROTECTIVE COLLISION GUARD FOR VEHICLE

BACKGROUND OF THE INVENTION

This invention relates to a protective collision guard for vehicles.

Each year in the United States tens of thousands of people are killed in automobile accidents. In addition to this, there are many other nonfatal accidents which result in personal injury and damage to the vehicles involved. It is therefore important to provide a safety device which minimizes the loss of death, personal injury, and vehicle damage resulting from collisions.

In the prior art, several attempts have been made to provide a protective bumper or tube which surrounds all or a portion of the vehicle and which has as its purpose the absorption of shock in collisions so as to minimize injury to the passengers and the vehicle. However, most of these bumpers or protective devices are located very low on the vehicle at a point which is below the place where the passenger is sitting. In such devices, the point of impact can be above the bumper or protective guard, and at the same time can be aimed directly at the passengers within the vehicle.

Some protective devices extend higher on the vehicle so as to partially protect the passenger, but these protective devices are usually segmented, so as to permit the opening and closing of doors for access into and out of the vehicle. The prior art fails to show a protective bumper or guard which extends completely around the vehicle in a continuous manner and which at the same time provides protection above the seating level where the passenger is sitting.

BRIEF DESCRIPTION OF THE INVENTION

Therefore, a primary object of the present invention is the provision of an improved protective collision guard for vehicles.

A further object of the present invention is the provision of an improved collision guard which extends completely around the vehicle in a continuous unbroken ring so as to provide protection from collisions from any direction.

A further object of the present invention is the provision of a protective collision guard which provides a continuous ring around the vehicle, and which extends upwardly sufficiently high on the vehicle to provide protection for the passengers within the vehicle.

A further object of the present invention is the provision of an improved protective collision guard for a vehicle, wherein the collision guard extends above the level at which the passenger is sitting, and wherein means for exit and entry of the vehicle are provided which are not interfered with by the protective guard.

A further object of the present invention is the provision of a protective collision guard for a vehicle which includes a protective nose cushion at the front of the vehicle filled with fibrous material for deflecting and absorbing head-on collisions.

A further object of the present invention is the provision of a device which is economical to manufacture, durable in use, and efficient in operation.

BRIEF DESCRIPTION OF THE DRAWINGS

FIG. 1 is a pictorial view of a vehicle embodying the present invention.

FIG. 2 is a side elevational view thereof.

FIG. 3 is a sectional view taken along line 3—3 of FIG. 2.

FIG. 4 is a partial sectional view taken along line 4—4 of FIG. 2.

DETAILED DESCRIPTION OF THE PREFERRED EMBODIMENT

Referring to the drawings, the numeral 10 generally designates a vehicle utilizing the present invention. Vehicle 10 includes a chassis 12 which is supported by four ground engaging wheels 14 in conventional fashion. Chassis 12 includes a top wall 16, two side walls 18, 20, a front wall 22, a rear wall 24, and a bottom wall 26 (FIG. 4). These walls define a passenger compartment 27.

A pair of front side doors 28 are provided in the chassis as well as a pair of rear side doors 30 and a rear door 32. As can be seen in FIG. 4, each of these doors includes a top edge 34 and a bottom edge 36. The doors are fitted over a door opening 38 having a top edge 40 and a bottom edge 42. The doors are hinged at their upper edge by means of a hinge 43 which pivots about a horizontal axis so that the door functions in a gull wing fashion. The door pivots about hinge 43 from the closed position shown in solid lines in FIG. 4 to the open position shown in shadow lines in FIG. 4.

Mounted within the passenger compartment 27 are four passenger seats 44. Additional passenger seats may be added or certain seats may be deleted without detracting from the invention. Each passenger seat includes a horizontal seating surface 46 (FIG. 4) upon which the passengers sit.

Extending completely around the outside surface of the chassis 12 is a continuous protective guard 48. Guard 48 is shown in cross-section in FIGS. 3 and 4 and includes an inner wall 49, an outer wall 51, and a pair of air compartments 50, 52 which are separated by a web 54. Air compartments 50, 52 extend completely around the perimeter of chassis 12 as can be seen in FIG. 3 so as to provide a continuous air cushion for absorbing external blows such as might occur in a collision. The compartments 50, 52 are completely enclosed and preferably are provided with a low pressure quantity of air. Furthermore, the guard 48 is made of an elastomeric material such as rubber which in combination with the low pressure air in compartments 50, 52 creates a resilient cushion effect when the guard is exposed to a collision.

The guard is housed within a guard receiving channel 56 in the outer walls of the chassis 12. The channel extends around the perimeter of the vehicle, and the guard 48 is secured in channel 56 by adhesive or other securing means.

Protruding from the front of the vehicle is an elongated nose 58 which comprises an outer skin 60 filled with fibrous stuffing 62. Nose 58 has at its extreme forward end a rounded point or apex 63. Extending rearwardly from point 63 are a pair of tapered sidewalls 64, 66. When viewed in profile (FIG. 2), the nose 58 also includes an inclined profile line 68 which extends upwardly from point 63.

An important feature of the present invention is the fact that the upper edge of protective guard 48 is positioned upwardly above the seating surface 46 of seats 44. This provides a protection for the passengers who are seated in the vehicle because the passengers are resting on the supporting surface 46 below the upper edge of the guard 48. In prior devices, the guards which have been provided are generally positioned below the seating surface of the seats within the vehicle. Those guards in prior devices which are positioned above the seating surfaces are broken or segmented around the vehicle so as to permit doors to be opened. The present invention, however, provides a continuous guard 48 which is not segmented or broken and which extends completely around the vehicle. This is made possible by virtue of the fact that the gull wing doors 28, 30 and the rear door 32 are all positioned above the guard 48.

In order to facilitate entry and exit from the vehicle a retractable step 72 is provided which can be retracted into a step receptacle 70 in the lower edge of vehicle 10 as shown in FIG. 4. A pneumatic or hydraulic cylinder 74 is attached to the step 72 so as to extend the step 72 from its retracted position shown in solid lines in FIG. 4 to its extended position shown in shadow lines in FIG. 4. Solenoids or other power means can be utilized to extend and retract step 72.

The nose 58 provides an additional protection for the vehicle in the event of a head-on collision. The pointed nature of the nose 48 will cause the colliding blow to be deflected in many cases to one side or the other. Furthermore, the combined effect of the fibrous stuffing 62 and the protective guard 48 provide further cushioning of the external blow from the front wall 22 of the vehicle. It should be noted that the protective guard 48 is positioned between the nose 58 and the front wall 22, so as to combine with the fibrous stuffing 62 to provide this cushioning effect. Thus, it can be seen that the device accomplishes all of its stated objectives.

I claim:

1. In combination:
   a vehicle chassis comprising a top wall, a bottom wall, a front wall, a rear wall, and opposite sidewalls enclosing a passenger compartment therein;
   said sidewalls each having at least one access opening therein, said access openings each having a lower edge and an upper edge;
   a door fitted in covering relation over each of said access openings, said door having a bottom door edge adjacent said lower edge of said access opening and a top door edge;
   hinge means hinging said top door edge to said upper edge of said access opening for permitting hinged movement of said door about a horizontal axis, which runs generally parallel to said sidewalls of said vehicle, from a closed position to an open position;
   at least one passenger seat within said compartment having a horizontal sitting surface positioned below said lower edges of said access openings;
   a continuous channel extending horizontally completely around the perimeter of said vehicle chassis;
   a continuous protective member attached to the outside surface of said vehicle chassis, said protective member being fitted within said continuous channel, and completely surrounding said front wall, said opposite sidewalls, and said rear wall, said protective member having an upper horizontal edge, a lower horizontal edge, and at least one elongated horizontal air compartment therein extending completely around said vehicle chassis;
   a cushion member made of fibrous material and including a protruding pointed nose pointing forwardly away from said front wall of said vehicle, said nose having a rounded apex and tapering rearwardly upwardly and laterally outwardly therefrom;
   said protective member being positioned between said cushion member and said front wall;
   said protective member being comprised of an elastomeric material; and
   said upper edge of said protective member being above said horizontal sitting surface of said seat and being below said lower edge of said access opening.

2. A combination according to claim 1 comprising a second air compartment within said protective member, said second air compartment being elongated and extending parallel to said first mentioned compartment, an elongated web wall extending parallel to and separating said first mentioned and second air compartments.

3. A combination according to claim 2 comprising at least one step, step mounting means movably mounting said step to one of said sidewalls below said lower edge of said access opening, said step mounting means permitting movement of said step from an operable position wherein said step protrudes laterally outwardly from said one sidewall to a retracted position wherein said step does not protrude laterally outwardly from said one sidewall.

* * * * *